United States Patent
Deshpande et al.

(10) Patent No.: US 7,606,956 B2
(45) Date of Patent: Oct. 20, 2009

(54) 12C SLAVE DEVICE WITH PROGRAMMABLE WRITE-TRANSACTION CYCLES

(75) Inventors: Amrita Deshpande, Chandler, AZ (US); Alma Anderson, Chandler, AZ (US); Jean-Marc Irazabal, Santa Clara, CA (US); Stephen Blozis, Morgan Hill, CA (US); Paul Boogaards, Cary, NC (US)

(73) Assignee: NXP B.V., Eindhoven (NL)

( * ) Notice: Subject to any disclaimer, the term of this patent is extended or adjusted under 35 U.S.C. 154(b) by 161 days.

(21) Appl. No.: 11/913,057

(22) PCT Filed: May 1, 2006

(86) PCT No.: PCT/IB2006/051360

§ 371 (c)(1),
(2), (4) Date: Oct. 29, 2007

(87) PCT Pub. No.: WO2006/117747

PCT Pub. Date: Nov. 9, 2006

(65) Prior Publication Data

US 2008/0189458 A1    Aug. 7, 2008

Related U.S. Application Data

(60) Provisional application No. 60/676,360, filed on Apr. 29, 2005.

(51) Int. Cl.
G06F 13/00    (2006.01)
G06F 3/00    (2006.01)
G06F 13/38    (2006.01)

(52) U.S. Cl. .............................. 710/110; 710/8; 710/10; 710/104

(58) Field of Classification Search ................ 710/104, 710/110
See application file for complete search history.

(56) References Cited

U.S. PATENT DOCUMENTS 6,799,233 B1    9/2004    Deshpande et al.

(Continued)

FOREIGN PATENT DOCUMENTS

EP    0529933 B1    5/1998

(Continued)

OTHER PUBLICATIONS

"Higher bit-width I/O Expanders"; Philips Semiconductors; Mar. 2006; pp. 1-2.*

(Continued)

Primary Examiner—Ryan M Stiglic

(57) ABSTRACT

Consistent with one example embodiment, communications systems, using a serial data transfer bus having a serial data line and a clock line used to implement a communications protocol, incorporate programmable updating of slave device output banks sequentially or simultaneously. The communications system includes two or more slave devices and/or a slave device having two or more banks of output drivers. Each slave device receives serial data and provides a data word assembled from the serial data. A programmable register in each slave device is programmed, using the communications protocol, to select one or more slave device configurations. Each of the two or more slave devices and/or two or more banks of output drivers updates either sequentially, or in coordination with other of the two or more slave devices and/or two or more banks of output drivers, based on each slave devices configuration selected by its programmable register.

16 Claims, 4 Drawing Sheets

U.S. PATENT DOCUMENTS

| | | | |
|---|---|---|---|
| 7,015,825 B2 * | 3/2006 | Callahan | 340/815.45 |
| 7,193,551 B2 * | 3/2007 | Chia | 341/144 |
| 7,327,337 B2 * | 2/2008 | Callahan | 345/82 |
| 7,483,003 B2 * | 1/2009 | Nogawa | 345/82 |
| 2004/0207341 A1 * | 10/2004 | Callahan | 315/291 |
| 2005/0062685 A1 * | 3/2005 | Nogawa | 345/46 |
| 2006/0192742 A1 * | 8/2006 | Chia | 345/100 |
| 2006/0192743 A1 * | 8/2006 | Chia | 345/100 |
| 2007/0018936 A1 * | 1/2007 | Chia | 345/98 |
| 2008/0030441 A1 * | 2/2008 | Callahan | 345/82 |

FOREIGN PATENT DOCUMENTS

EP      1071067 A2     1/2001

OTHER PUBLICATIONS

"17-Output LED Driver/GPO with Intensity Control and Hot-Insertion Protection"; Maxim Integrated Products; Mar. 2005; all pages.*

"16-Channel Fm+ I2C-Bus Constant LED Sink Driver"; Texas Instruments; Jul. 2008; all pages.*

Deshpande, Amrita "Design of a Behavioral (Register Transfer Level, RTL) Model of the Inter-Integrated Circuit or I2C-Bus Master-Slave Interface" Master's Thesis of Amrita Deshpande, University of New Mexico, 1999.

* cited by examiner

I2C SLAVE DEVICE WITH PROGRAMMABLE WRITE-TRANSACTION CYCLES

The present invention is directed generally to communication devices and methodologies, and more particularly, to methods and arrangements for programmably updating slave device output banks using an I2C serial data bus.

The Inter-Integrated Circuit (I2C) bus developed by Philips Corporation allows integrated circuits to communicate directly with each other via a simple bidirectional 2-wire bus (plus power and ground). A device connects to each of the two wires on the bus, one serial data line (SDA) for the communication of data, and the other serial clock line (SCL) for the control and synchronization of the communication of data between the devices. Each device is connected in parallel to each of the other devices, and each of the bus lines, SDA and SCL, function as a wired-AND of all the lines on the bus. The output of each device is configured as an open-collector/open-drain device, and one or more pull-up resistors maintain a 'soft' logic high value on the bus while the bus is in the quiescent state. When a device desires access to the bus, the device pulls the bus to a logic low value, via the open-collector/open-drain device that is placed in a conductive state to ground potential.

Each device that is connected to an I2C bus is identifiable by an address, and can operate as either a transmitter or a receiver, or both. Data transfers are effected using a master-slave communications protocol. A master is a device that initiates a data transfer and generates the clock signals to permit the transfer; any device that is addressed is considered a slave for this transfer. The data transfer can be initiated by a master to either transmit data to the slave (herein designated as write), or to request data from the slave (herein designated as read). For example, an output device, such as a display screen, is typically not able to initiate a data transfer, and therefore would be configured to only operate as a slave device. A microprocessor, on the other hand, will typically be configured to operate as either a master or a slave, as the situation demands.

In a quiescent state, both the SDA and SCL bus lines are in the logic-high state (herein designated as high, or logic state of 1). A master initiates a data transfer by asserting a transition to a logic-low state (herein designated as low, or logic state of 0) on the SDA line while the SCL line is high; this is termed a START condition. Thereafter, the master toggles the SCL line to control the synchronization of the data transfer; data value changes occur on the SDA line when the SCL clock is low, and the state of the SDA line is considered valid only when the SCL clock is high.

Multiple STARTs can be asserted to effect a series of data transfers within the same transfer session. Generally, each data transfer requires an acknowledgement from the addressed recipient of the data transfer. To terminate the data transfer, the host asserts a low-to-high transition on the SDA line while the SCL clock is high; this is termed a STOP condition. Thereafter, any device may assume control of the bus as a master by asserting a high-to-low transition on the SDA line, as above. Note that, for ease of reference, the term assert is used herein for effecting, or attempting to effect, the specified logic state. In the example of a transition to a logic-high state, this is typically provided by a release of the bus from a forced pull-down state by the asserting device. This assertion of a logic-high state allows the aforementioned pull-up devices on the bus to bring the bus to a logic-high state, unless another device is also forcing the pull-down state.

The general format of an I2C data transfer involves signals on an SDA line and an SCL line forming the I2C bus. A START condition (S) corresponds to high-to-low transition of the signal on the SDA line while the SCL line is high. After the START, the host transmits an address, nominally seven bits, followed by a read/write-not indicator. After transmitting the address and the direction of data transfer (R/W-), the host releases the SDA line, allowing it to rise to a logic-high level. If a slave device recognizes its address, the slave device transmits an acknowledge signal (ACK) by pulling the bus low. The absence of a low signal when the host releases the SDA line, therefore, indicates a non-acknowledgement (NAK). If the address is acknowledged, via a low at SDA, the transmitting device transmits the data. If the direction of data transfer is a "read" relative to the host, then the slave device is the transmitting device; if the direction is a "write" relative to the host, then the master device is the transmitting device. The transmitting device releases control of the SDA line, and the receiving device acknowledges the receipt of the data by asserting a logic-low value on the SDA line. If the data is acknowledged, the transmitter sends additional data. This process continues until the entirety of the data is communicated, or until a transmitted data item is not-acknowledged. The master can subsequently reassert a START signal, and repeat the process above, or, can assert a STOP signal (P) to terminate this data-transfer session.

The above interface protocol can be implemented in a variety of ways. To minimize the development time for programming or designing an I2C interface, a variety of general-purpose interface schemes have been published. "DESIGN OF A BEHAVIORAL (REGISTER TRANSFER LEVEL, RTL) MODEL OF THE INTER-INTEGRATED CIRCUIT OR I2C-BUS MASTER-SLAVE INTERFACE", Master's Thesis of Amrita Deshpande, University of New Mexico, 1999, discloses an I2C master interface and slave interface that is intended to be embodied in an I2C device, and is incorporated by reference herein. By providing a verified I2C interface, system designers need not address the details of the I2C specification and protocol. Both the master and the slave interfaces of this thesis are state-machine based. State-machine based systems and methods are further described in U.S. Pat. No. 6,799,233, which is hereby incorporated herein by reference.

Various aspects of the present invention are directed to methods and arrangements for programmably updating slave device output banks using an I2C serial data bus in a manner that addresses and overcomes the above-mentioned issues.

Consistent with one example embodiment, the present invention is directed to a communications system that uses an I2C serial data transfer bus that has a serial data line and a clock line used to implement a communications protocol. The communications system includes two or more slave devices, each slave device having input circuitry configured to receive serial data using the serial data transfer bus and provide a data word assembled from the serial data. A programmable register in each slave device is configured to be programmed, using the communications protocol, to select one or more slave device configurations. Each slave device further has at least one bank of output drivers, configured to update the output drivers using the assembled data word provided by the input circuitry. Each of the two or more slave devices updates its output drivers either sequentially, or in coordination with other of the two or more slave devices, based on each slave devices configuration selected by its progammable register.

Consistent with another example embodiment, the present invention is directed to a communications system using an I2C serial data transfer bus that has a serial data line and a clock line used to implement a communications protocol. A slave device for the communications system includes input circuitry configured to receive serial data using the serial data transfer bus and provide data words assembled from the serial data. A programmable register in the slave device is configured to be programmed, using the communications protocol, to select one or more slave device configurations. The slave device includes at least two banks of output drivers, configured to receive assembled data words provided by the input circuitry, wherein each bank of the at least two banks of output drivers updates its output drivers either sequentially, or in coordination with other of the at least two banks of output drivers, based on the slave device configuration selected by the progammable register.

Consistent with a further example embodiment, the present invention is directed to a method for a slave device of an I2C communications system to update at least two banks of output drivers in the slave device. The method involves programming a register in the slave device, using the communications protocol, to designate whether the at least two banks of output drivers are to update sequentially or to update in parallel. Serial data is received using the serial data transfer bus, and assembled into one or more data words. The at least two banks of output drivers are updated using the assembled one or more data words, each bank updating either sequentially or in parallel relative to other banks, based on the programmed register.

Consistent with another example embodiment, the present invention is directed to a computer-readable medium having computer-executable instructions for writing one or more data words using at least two banks of output drivers in an I2C slave device. The computer-executable instructions perform steps involving programming a register in a slave device, using an I2C communications protocol, to designate whether each of the at least two banks of output drivers are to update sequentially or to update in parallel with respect to other of the at least two banks of output drivers. One or more data words are assembled within the I2C slave device from serial data received using the I2C communications protocol. The at least two banks of output drivers are updated using the assembled one or more data words, each bank updating either sequentially or in parallel relative to other banks, based on the programmed register.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

The invention may be more completely understood in consideration of the following detailed description of various embodiments of the invention in connection with the accompanying drawings, in which.

Figure 1:
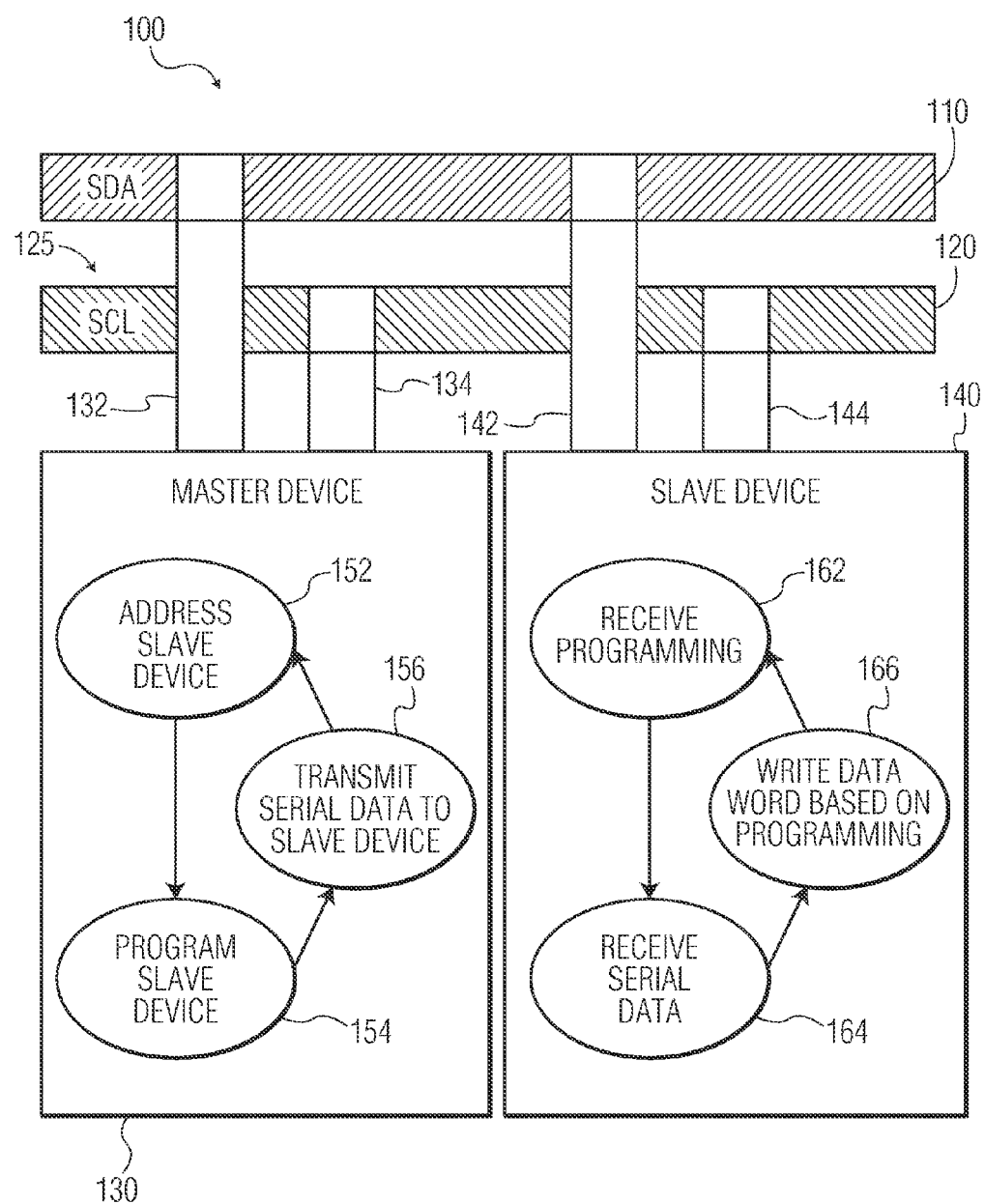
FIG. 1 is a block diagram of a data communications system implementing programmable updating of slave device output banks sequentially or simultaneously in accordance with embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is generally applicable to methods and arrangements for programmably updating slave device output banks using an Inter Integrated Circuit serial data bus. The invention has been found to be particularly advantageous for Inter Integrated Circuit (I2C) serial data communications busses, but is also advantageous for other busses and communications protocols, such as system management bus (SM-Bus) architectures and/or protocols or other serial data communications systems. For purposes of illustration, and not of limitation, the invention will be described in the context of an I2C bus having a master device controlling communication to a slave device.

Masters control the communication with I2C slaves on the I2C bus architecture. I2C slaves find numerous applications in fields ranging from cell phones, PDAs and SmartPhones to LCD TVs, Medical Equipment, Gaming, and other applications. One particular application of an I2C slave is as a General Purpose Input/Output (GPIO) device. In this type of device, there are a number of multi-function pins that can be used as inputs or outputs. When used as inputs, these pins typically indicate the state of certain signals that are being monitored.

A particular application of an I2C slave is as a General Purpose Input/Output (GPIO). In this type of device, there are a number of multi-function pins that can be used as inputs or outputs. When configured as outputs, these devices can be used in a system for e.g. to drive many light emitting diodes (LEDs). These outputs are divided into banks and programmed individually via the I2C bus. A bank of 8 bits will get programmed with one I2C WRITE transaction. The data in the bank gets updated at the end of the WRITE cycle, i.e. at the 9th clock cycle also called the ACKNOWLEDGE clock cycle. Sometimes, the application requires that ALL the banks get updated at the same time instead of one word at a time. This is accomplished by updating all the banks at the end of all the WRITE cycles, on an I2C STOP condition. The proposed feature allows update of the banks on either event based on a programmable bit that controls which event to use for the update. This bit can be programmed via the I2C bus.

Consistent with one example embodiment, communications systems, using a serial data transfer bus having a serial data line and a clock line used to implement a communications protocol, incorporate programmable updating of slave device output banks sequentially or simultaneously. The communications system includes two or more slave devices and/or a slave device having two or more banks of output drivers. Each slave device receives serial data and provides a data word assembled from the serial data. A programmable register in each slave device is programmed, using the communications protocol, to select one or more slave device configurations. Each of the two or more slave devices and/or two or more banks of output drivers updates either sequentially, or in coordination with other of the two or more slave devices and/or two or more banks of output drivers, based on each slave devices configuration selected by its progammable register.

In an example embodiment, the present invention incorporates programmable updating of slave device output banks sequentially or simultaneously by programming a control bit via the I2C bus. For example, Table 1 illustrates an example of a programmable register that may be provided in a slave device in accordance with the present invention. Table 1 illustrates an 8 bit word programmed into the register as the default setting. The six most significant bits and the least significant bit are not yet assigned. The bit designated output change (OCH) is assigned a logic value of 1.

TABLE 1

| Mode Selection Register | | | | | | | |
|---|---|---|---|---|---|---|---|
| Bit | | | | | | | |
| X | X | X | X | X | X | OCH | X |
| Default 0 | 0 | 0 | 0 | 0 | 0 | 1 | 0 |

The OCH bit in the Mode Selection register illustrated in Table 1 is used to determine whether the output drivers in the slave device will be updated on a STOP or an ACKNOWLEDGE clock pulse.

OCH=0: Outputs update on a STOP command.

OCH=1: Outputs update on an ACKNOWLEDGE clock cycle.

As shown in the FIG. 1, when the OCH=1, the individual registers get updated on an ACKNOWLEDGE cycle whereas when OCH=0, all the registers get updated on the STOP command. Consistent with one example embodiment, communications systems, using a serial data transfer bus having a serial data line and a clock line used to implement a communications protocol, incorporate programmable updating of slave device output banks sequentially on an ACKNOWLEDGE clock cycle or simultaneously on a STOP command.

Slave devices may be configured as general purpose Input/Output (GPIO) devices, coding/decoding (CODEC) arrangements, or other slave devices. The communication system may conform to I2C, SMBus, and/or other serial communication specifications.

FIG. 1 is a block diagram of a data communications system 100 implementing programmable updating of slave device output banks sequentially or simultaneously in accordance with embodiments of the present invention. An SDA line 110 and an SCL line 120 are arranged as an I2C data bus 125. A master device 130 and a slave device 140 are attached to the I2C data bus 125. The master device 130 is electrically connected to the I2C data bus 125 using an SCL connection 134 and a data connection 132 electrically connected to the SCL line 120 and the SDA line 110 respectively.

The slave device 140 is electrically connected to the I2C data bus 125 using an SCL connection 144 and a data connection 142 electrically connected to the SCL line 120 and the SDA line 110 respectively. The master device 130 addresses 152 the slave device 140, and programs 154 the slave device to operate in a particular mode, to update sequentially or simultaneously, for example.

The slave device 140 receives 162 the program 154, such as by placing a bit in a register that designates the operating mode of the slave device 140. The master device 130 transmits 156 serial data over the I2C data bus 125 to the slave device 140, which the slave device 140 receives 164 and converts into one or more words that are desired for output by the slave device 140, for example. The slave device 140 writes the one or more words 166 based on the programming 154, either sequentially or simultaneously, as will be discussed further with reference to FIG. 3.

Figure 2:
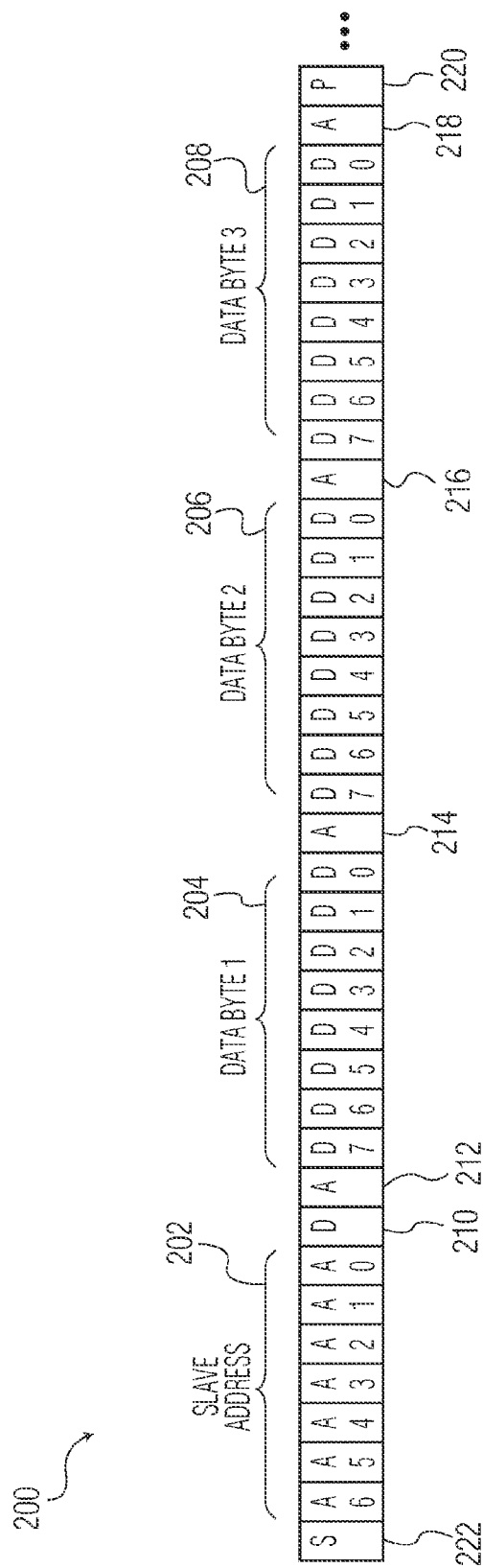
FIG. 2 is an illustration of a data stream for a data communications system implementing programmable updating of slave device output banks sequentially or simultaneously in accordance with embodiments of the present invention.

FIG. 2 is an illustration of a serial data stream 200 for a data communications system implementing programmable updating of slave device output banks sequentially or simultaneously in accordance with embodiments of the present invention. The serial data stream 200 is illustrated in FIG. 2 consistent with an I2C communications protocol. A slave address 202 follows a START condition 222 transmitted by a master on an I2C bus. The slave address 202 is followed by a READ/WRITE bit 210, and a subsequent ACKNOWLEDGE signal 212 from the slave device. The READ/WRITE signal 210 is illustrated in FIG. 2 as a logic 0, indicating a write from the master to the slave. A first data byte 204, second data byte 206, and a third data byte 208 are transmitted by the master device, each data byte 204, 206, 208 followed by a respective ACKNOWLEDGE 214, 216, 218 from the slave device.

Each data byte 204, 206, 208 may be assembled into a word in the slave device, which may, for example, be presented at output drivers of the slave device to drive a binary coded decimal (BCD) LED display. In accordance with the present invention, the slave device may update its output drivers sequentially, in response to each ACKNOWLEDGE 214, 216, 218, or the slave device may update its output drivers simultaneously in response to a STOP condition 220.

Figure 3:
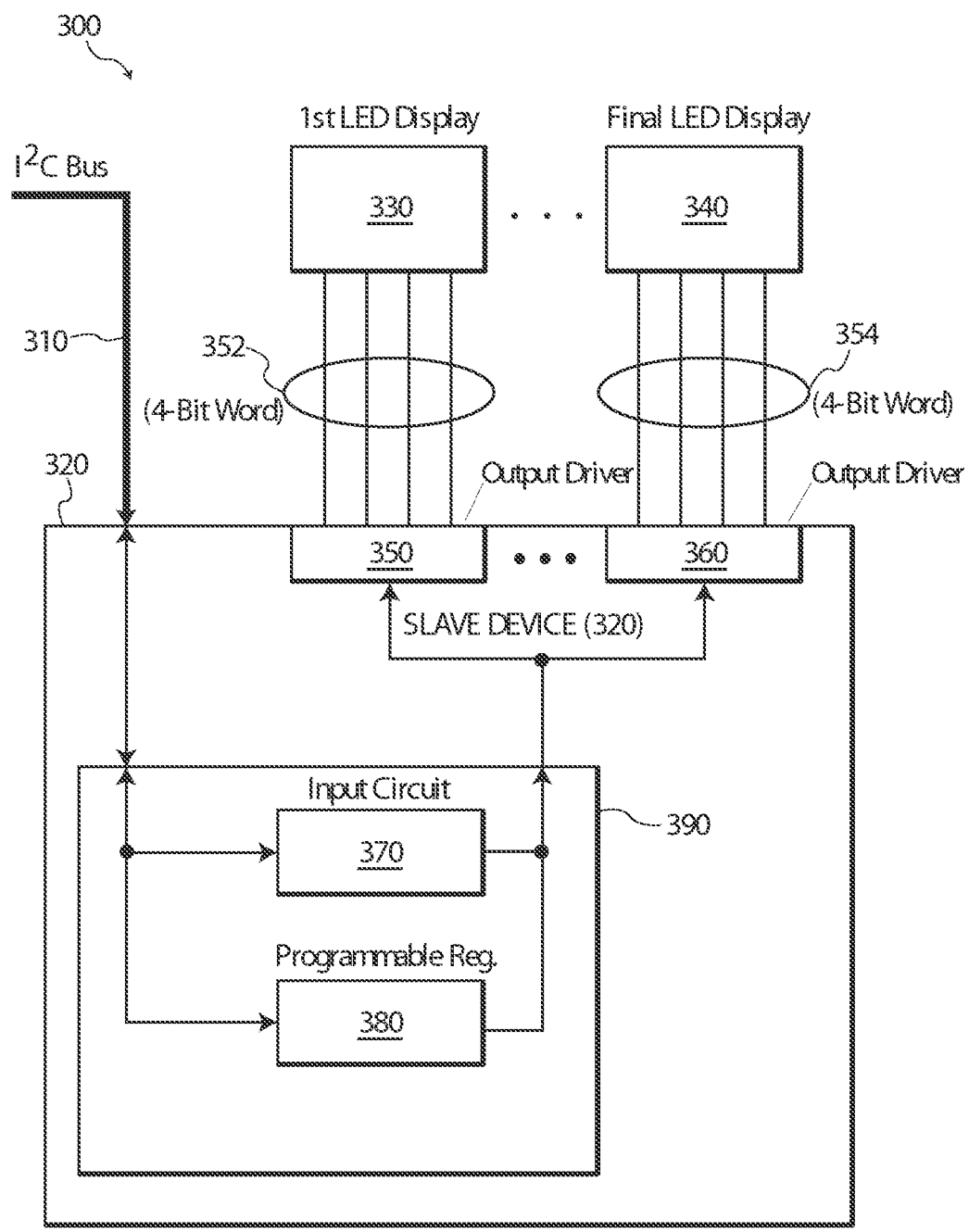
FIG. 3 is a block diagram of a system implementing programmable output bank writing in accordance with embodiments of the present invention.

FIG. 3 is a block diagram of a system 300 implementing programmable output bank writing in accordance with embodiments of the present invention. A slave device 320 is connected to an I2C bus 310. The slave device 320 is illustrated in FIG. 3 as a GPIO device, coupled to a first LED display 330, through a final LED display 340. As indicated by the dots between the first LED display 330 and the final LED display 340, any number of displays may be driven by the slave device 320. Each LED display 330 through 340 is driven by a dedicated output driver 350 through 360 respectively. In the present example, a 4-bit word 352, 354 is used by the output drivers 350, 360 to update the LED displays 330, 340 respectively. The 4-bit words 352, 354 may be the same word, repeated, or may be different words.

The slave device 320 receives serial data, such as illustrated in FIG. 2, from the I2C bus 310. Circuitry 390 in the slave device 320 is illustrated in this example to include data input circuitry 370 and a programmable register 380. For example, the programmable register 380 may be defined similarly to the mode selection register of Table 1, above. The input circuitry 370 is configured to receive serial data using the I2C bus 310 and provide data words 352, 354, assembled from the serial data, to at least two banks of output drivers 350, 360.

The programmable register 380 is configured to be programmed, using the I2C bus 310 communications protocol, to select one or more slave device configurations. The at least two banks of output drivers 350, 360, are configured to receive assembled data words provided by the input circuitry 370, wherein each bank of the at least two banks of output drivers 350, 360 updates its output drivers 350, 360, either sequentially, or in coordination with other of the at least two banks of output drivers 350, 360, based on the slave device configuration selected by the progammable register 380.

Figure 4:
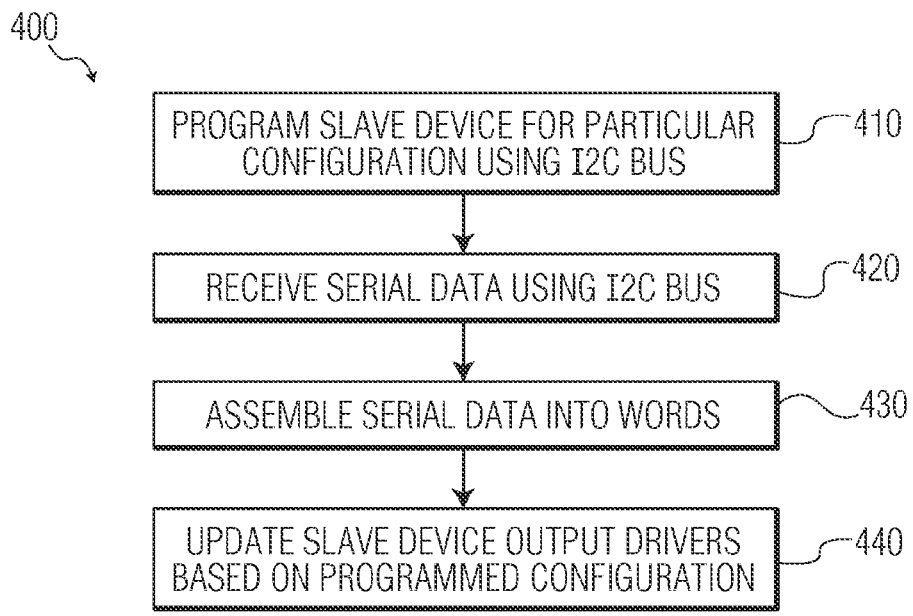
FIG. 4 is a flow chart of a method for implementing programmable updating of slave device output banks sequentially or simultaneously in accordance with embodiments of the present invention.

FIG. 4 is a flow chart of a method 400 for implementing programmable updating of slave device output banks sequentially or simultaneously in accordance with embodiments of the present invention. The method 400 involves a slave device, such as a GPIO device, updating at least two banks of output drivers in the slave device, either sequentially, or in coordination with other of the at least two banks of output drivers, based on the slave device configuration selected by a progammable register. The method involves programming 410 the slave device for a particular configuration, such as by using a register in the slave device. The programming may be performed using an I2C communications protocol, to designate whether the output drivers of the slave device are to update sequentially or to update in parallel. Serial data is received 420 using a serial data transfer bus, such as an I2C bus, and assembled 430 into one or more data words. The at least two banks of output drivers are updated 440 using the assembled one or more data words, each bank updating either sequentially or in parallel relative to other banks, based on the programming 410. The use of a GPIO device as the slave device implementing the method 400 is for purposes of illustration only, and not for limitation.

Figure 5:
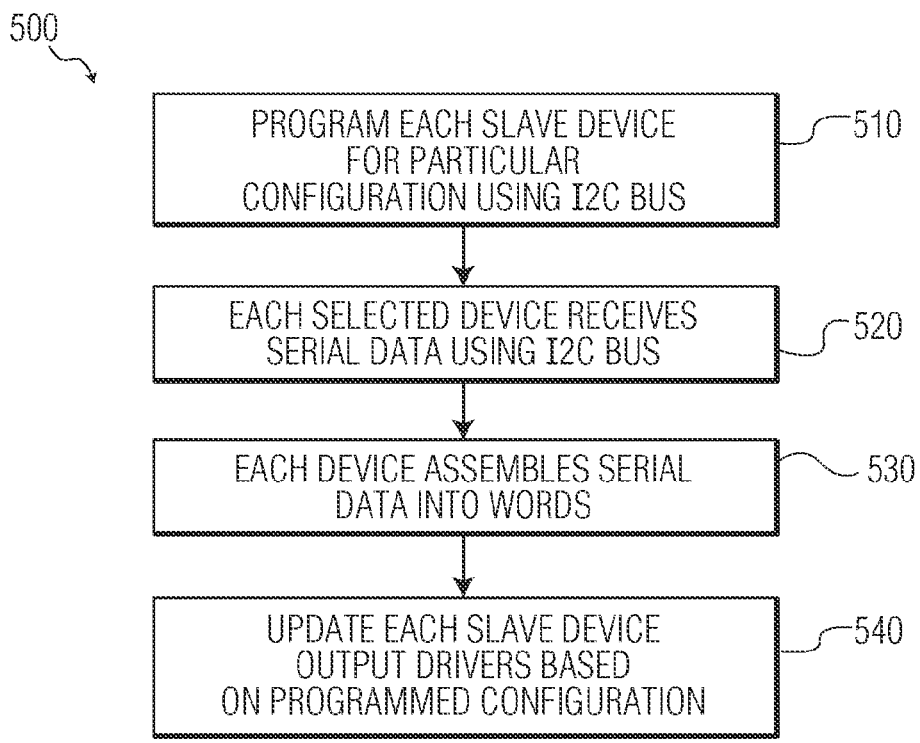
FIG. 5 is a flow chart of another method for implementing programmable updating of slave device output banks sequentially or simultaneously in accordance with other embodiments of the present invention.

FIG. 5 is a flow chart of a method 500 for implementing programmable updating of multiple slave devices sequentially or simultaneously in accordance with other embodiments of the present invention. For purposes of illustration, and not of limitation, the method 500 will also be described in the context of GPIO slave devices on an I2C bus.

For example, two or more slave devices may be connected to an I2C bus. Each slave device includes input circuitry configured to receive serial data using the I2C bus and provide a data word assembled from the serial data. A programmable register in each slave device is programmed 510, using the communications protocol, to select one or more slave device configurations. Serial data is received 520 using the I2C bus, and assembled 530 into a data word. Each slave device updates 540 its output drivers using the assembled data word. Each of the two or more slave devices updates its output drivers either sequentially, or in coordination with other of the two or more slave devices, based on each slave devices configuration selected by its programming 510.

Hardware, firmware, software or a combination thereof may be used to perform the various embodiments of programmably updating slave device output banks using an I2C serial data bus as is described herein. The servicing function used in connection with the invention may reside in a master device as described, or may alternatively reside on a stand-alone or networked computer attached to the serial data communications system 100. The serial data communications system 100 illustrated in FIG. 1 is an example structure that can be used in connection with such communications systems, computers, or other computer-implemented devices to carry out operations of the present invention.

The example master device 130 illustrated in FIG. 1, suitable for performing the programming in accordance with the present invention, typically includes a central processor (CPU) coupled to random access memory (RAM) and/or some variation of read-only memory (ROM). The ROM may also be other types of storage media to store programs, such as programmable ROM (PROM), erasable PROM (EPROM), etc. The processor may communicate with other internal and external components through input/output (I/O) circuitry and/or other bussing, to provide control signals, communication signals, and the like.

The master device 130 may also include one or more data storage devices, including hard and floppy disk drives, CD-ROM drives, and other hardware capable of reading and/or storing information, such as DVD, etc. In one embodiment, software for carrying out programmable updating of slave device output banks using an I2C serial data bus in accordance with the present invention may be stored and distributed on a CD-ROM, diskette, or other form of media capable of portably storing information. These storage media may be inserted into, and read by, devices such as a CD-ROM drive, the disk drive, etc. The software may also be transmitted to the computing arrangement via data signals, such as being downloaded electronically via a network, such as the Internet. Further, as previously described, the software for carrying out the functions associated with the present invention may alternatively be stored in internal memory/storage of the computing device, such as in the ROM.

Any resulting program(s), having computer-readable program code, may be embodied within one or more computer-usable media such as memory devices or transmitting devices, thereby making a computer program product or article of manufacture according to the invention. As such, the terms "computer readable medium," "article of manufacture," "computer program product" or other similar language as used herein are intended to encompass a computer program which exists permanently, temporarily, or transitorily on any computer-usable medium such as on any memory device or in any transmitting device.

Each feature disclosed in this specification (including any accompanying claims, abstract, and drawings), is replacable by alternative features having the same, equivalent or similar purpose, unless expressly stated otherwise. Thus, unless expressly stated otherwise, each feature disclosed is one example only of a generic series of equivalent or similar features.

Accordingly, various embodiments have been described as example implementations of the present invention for programmably updating slave device output banks using an I2C serial data bus. The present invention should not be considered limited to the particular examples described above. Various modifications, equivalent processes, as well as numerous structures to which the present invention may be applicable fall within the scope of the present invention. For example, programmable updating of slave device output banks using an I2C serial data bus can be implemented using a similarly constructed one-way or two-way interface for communication between devices on a common bus, such as an SMBus or other bus arrangement. Such variations may be considered as part of the claimed invention, as fairly set forth in the appended claims.

What is claimed is:

1. In a communications system using an Inter-Integrated Circuit (I²C) serial data transfer bus that has a serial data line and a clock line used to implement a communications protocol, a slave device, comprising:

input circuitry configured to receive serial data using the serial data transfer bus and provide data words assembled from the serial data;

a programmable register configured to be programmed, using the communications protocol, to select one or more slave device configurations; and at least two banks of output drivers, configured to receive assembled data words provided by the input circuitry, wherein each bank of the at least two banks of output drivers updates its output drivers either sequentially, or in coordination with other of the at least two banks of output drivers, based on the slave device configuration selected by the programmable register.

2. The device of claim 1, wherein the slave device is configured as a general purpose Input/Output device.

3. The device of claim 1, wherein the at least two banks of output drivers update within one clock cycle when the slave device configuration is selected for coordinated writing.

4. The device of claim 1, wherein each bank of the at least two banks of output drivers updates its output drivers in response to an acknowledge signal from the input circuitry when the slave device configuration is selected for sequential writing.

5. The device of claim 1, wherein each bank of the at least two banks of output drivers updates its output drivers in response to a stop condition on the I²C bus when the slave device configuration is selected for coordinated writing.

6. In a communications system using an I²C serial data transfer bus that has a serial data line and a clock line used to implement a communications protocol, a method for a slave device to update at least two banks of output drivers in the slave device, comprising:
   programming a register in the slave device, using the communications protocol, to designate whether the at least two banks of output drivers are to update sequentially or to update in parallel;
   receiving serial data using the serial data transfer bus;
   assembling one or more data words from the serial data; and
   updating the at least two banks of output drivers using the assembled one or more data words, each bank updating either sequentially or in parallel relative to other banks, based on the programmed register.

7. The method of claim 6, wherein the serial data transfer bus further conforms to an SMBus serial communication specification.

8. The method of claim 6, wherein the slave device is configured as a general purpose Input/Output device.

9. The method of claim 6, wherein the at least two banks of output drivers update within one clock cycle when the slave device is programmed for parallel writing.

10. The method of claim 6, wherein each bank of the at least two banks of output drivers writes in response to an acknowledge signal when the register is programmed for sequential writing.

11. The method of claim 6, wherein each bank of the at least two banks of output drivers writes in response to a stop condition on the I²C bus when the register is programmed for coordinated writing.

12. A communications system using an I²C serial data transfer bus that has a serial data line and a clock line used to implement a communications protocol, the communications system comprising:
   two or more slave devices, each slave device comprising:
   input circuitry configured to receive serial data using the serial data transfer bus and provide a data word assembled from the serial data;
   a programmable register configured to be programmed, using the communications protocol, to select one or more slave device configurations; and
   at least one bank of output drivers, configured to output the assembled data word provided by the input circuitry; and
   wherein each of the two or more slave devices updates its output drivers either sequentially, or in coordination with other of the two or more slave devices, based on each slave devices configuration selected by its programmable register.

13. The device of claim 12, wherein the two or more slave devices are configured as general purpose Input/Output devices.

14. The device of claim 12, wherein the two or more slave devices update within one clock cycle when the slave device configuration is selected for coordinated writing.

15. The device of claim 12, wherein the two or more slave devices update their output drivers in response to an acknowledge signal from the input circuitry when the slave device configuration is selected for sequential writing.

16. The device of claim 12, wherein the two or more slave devices update their output drivers in response to a stop condition on the I2C bus when the slave device configuration is selected for coordinated writing.

* * * * *